July 3, 1956
E. J. RICKNER
2,753,515
CAPACITOR TYPE DIFFERENTIAL PRESSURE SWITCH
Filed Sept. 3, 1952
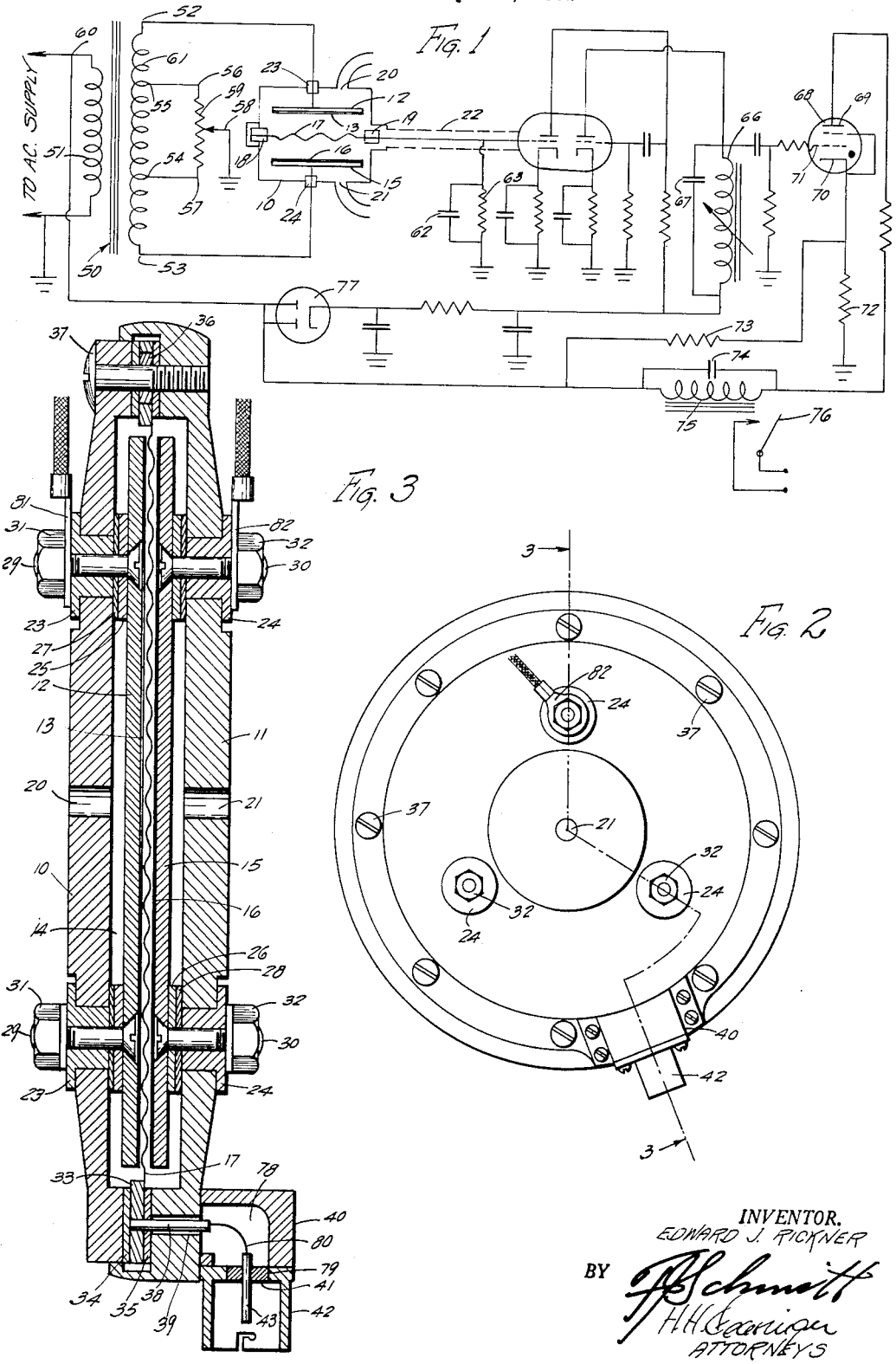
INVENTOR.
EDWARD J. RICKNER
BY 
ATTORNEYS

United States Patent Office 2,753,515
Patented July 3, 1956

2,753,515

CAPACITOR TYPE DIFFERENTIAL PRESSURE SWITCH

Edward J. Rickner, Glenside, Pa.

Application September 3, 1952, Serial No. 307,729

1 Claim. (Cl. 323—74)

(Granted under Title 35, U. S. Code (1952), sec. 266)

The invention described herein may be manufactured and used by or for the Government of the United States of America for governmental purposes without the payment of any royalties thereon or therefor.

This invention relates to a pressure responsive control system and to a control switch for such a system.

It is often necessary in certain applications of fluid pressure systems to maintain the pressure of the fluid at a predetermined constant pressure or within a certain prescribed differential from a reference pressure. In prior applications the pump or other means which maintained pressure of the working fluid was controlled by means of mechanical linkages connected to a diaphragm which responded to changes in the reference pressure or to differentials in pressure between the reference fluid and the working fluid.

Mechanical systems had the disadvantages that the sensitivity, stability and precision of adjustment possible were critically limited by the mechanical precision of the parts and when the system was subject to acceleration forces, for example, in airplane installations, the inertia of the parts affected the operating point of the control.

The mechanical linkages were generally connected to open and close electrical contacts and here again serious difficulties were encountered due to wear of the contacts, the formation of films or dirt layers on the contacts and friction and sticking of the parts which affected the operating point and the pressure differential required to operate the mechanism.

The salient features of applicant's invention are the provision of a pressure sensing unit which converts a change in pressure or in pressure differential to a corresponding change in electrical capacitance which in turn causes the appearance of an unbalance voltage in a bridge circuit, the elimination of any mechanical connections between the diaphragm and the electrical contacts, the use of an electronic circuit to amplify the output of the bridge circuit and the utilization of a phase differentiating electronic circuit to energize a relay according to the phase and amplitude of the amplified voltage and thus close the electrical contacts which control the pump or permit the contacts to remain open.

It is an object of this invention to provide a differential pressure switch incorporating the features set forth above.

Other objects and many of the attendant advantages of this invention will be readily appreciated as the same becomes better understood by reference to the following detailed description when considered in connection with the accompanying drawings wherein:

Figure 1 is a schematic representation of the pressure sensing unit and the associated electronic circuits which constitute the invention;

Figure 2 is a plan view of the pressure sensing unit and

Figure 3 shows an enlarged cross-section of the pressure sensing unit taken on line 3—3 of Figure 2.

The structure and operation of the switch will be explained in conjunction with Figure 1. 50 is a transformer, the primary winding 51 thereof being connected to a source of alternating current voltage. The secondary 61 of the transformer has connected across its central portion at 54 and 55 a potentiometer 59 whose movable contact 58 is connected to ground. Thus a voltage $V_1$ appears between one side 52 of the secondary winding and ground and a voltage $V_2$ appears between the other side 53 of the secondary and ground. The ratio of voltages $V_1$ and $V_2$ may be changed by moving the center contact 58 of the potentiometer for a purpose to be hereafter explained. Each side of the secondary winding is connected to a separate circular disk 12 and 15 enclosed in a relatively flat cylindrical housing 10 which has a port at one side to admit a pressure $P_1$ and at the other side to admit a pressure $P_2$. A thin flexible disk or diaphragm 17 is located in the housing between the disks 12 and 15 and forms a pressure tight seal between the two chambers thus created. The disks 12 and 15 with the diaphragm 17 form two capacitors which constitute the capacitance arms of a capacitance bridge circuit. The capacitors are in series across the voltage source and the voltage drop $V_{c1}$ and $V_{c2}$ in each depends upon the capacitance $C_1$ and $C_2$ of each. The capacitances depend upon the relative position of the diaphragm with respect to each of the disks and the position of the diaphragm depends in turn upon the relationship of the pressures $P_1$ and $P_2$. Theoretically the diaphragm should assume a position in which it is equally spaced from disks 12 and 15 when $P_1$ equals $P_2$ and a balance condition wherein no voltage $V_0$ exists between diaphragm 17 and ground would occur when $P_1$ is equal to $P_2$ and the potentiometer is adjusted to make $V_1$ equal to $V_2$. In practice, however, since the diaphragm may be closer to one or the other of the disks and the capacitances of the two capacitors may not be identical, the conditions do not follow the theoretical.

In order to compensate for the deviation of the actual from the theoretical, the circuit is balanced as follows: with $P_1$ equal to $P_2$ the voltages $V_1$ and $V_2$ are adjusted by means of the potentiometer until $V_0$ equals zero. The bridge circuit may thus be balanced without the necessity of assuming the task of critical mechanical construction of the capacitor.

It can be seen that by following the balancing procedure outlined above the voltage $V_0$ may be made zero when a predetermined pressure differential $P_1$ minus $P_2$ exists. Thus the switch may be set to keep the pressures $P_1$ and $P_2$ equal to each other or to maintain a predetermined pressure differential $P_1$ minus $P_2$.

With the circuit in a balanced condition in which $P_1$ equals $P_2$ or with a given pressure differential $P_1$ minus $P_2$ a change in one of the pressures would cause the diaphragm to be deflected toward one of the disks 12 or 15. This would cause a change in the values of capacitances $C_1$ and $C_2$ accompanied by a change in the distribution of voltages between the capacitors and would result in the appearance of an output voltage $V_0$ between the diaphragm and ground.

The output voltage $V_0$ is carried through several stages of amplification and impressed on the grid 71 of a thyratron tube 68 which is normally in nonconducting condition. Applicant employs the two sections of a 12AX7 vacuum tube in cascade for amplification and carries the signal to the grid of the first section by means of a coaxial cable 22. A capacitor 62 is connected in parallel with the grid resistor 63 and changes may be made in its value to make slight changes in the phase of the voltage reaching the amplifying stages. Applicant successfully uses a .003 microfarad capacitor and a 1.5 megohm resistor with a 400 cycle signal voltage.

Direct current plate supply voltage for the amplifiers is provided from a rectifier 77 and associated filter circuit.

For example, applicant's circuit employs a 6 x 4 vacuum tube connected to the 400 cycle source. A band pass filter comprising a capacitor 67 and a variable inductor 66 is connected in the plate circuit of the final stage of amplification with the inductance set to pass the frequency of the supply voltage. Applicant's circuit, designed for a 400 cycle supply, utilizes a .01 microfarad capacitor and an inductance variable from 11 to 39 henries. The filter circuit prevents the passage of noise or harmonics onto the thyratron grid thereby providing greater sensitivity and stability of operation. Supply voltages for the thyratron are provided from the same alternating current source by a lead connected to the point 60. Bias resistors 72 and 73 are provided in the cathode circuit to keep the 2D21 tube used by applicant in the nonconducting region when there is no grid signal. When a positive signal is imposed on the grid 71 coincident with the occurrence of a positive voltage on the plate 69 and if the signal voltage is of sufficient amplitude with respect to the voltages on the plate and the cathode 70, the tube will fire and will continue to conduct for the remaining portion of the positive cycle of plate voltage. The output current of the thyratron will be a series of positive half-cycles resembling the unfiltered output of a half-wave rectifier. This current passes through the coil 75 of a relay which has control contacts 76 that open or close a circuit for a motor or pump or other device used to maintain the working pressure $P_2$. A capacitor 74 in parallel with the coil 75 acts to provide an average direct current through the coil or winding. It will be seen that if the voltage $V_0$ on the grid 71 is of a relatively low amplitude or is displaced in phase from the plate voltage on the thyratron so that conduction will take place only during a small part of the positive half-cycle of the plate voltage, the average current flowing through the winding 75 will be insufficient to operate the relay and contacts 76 will remain open. Therefore, it is evident that control of the switch is dependent not only upon the amplitude of the signal voltage, but on the phase as well. Thus, should the differential pressure $P_1 - P_2$ fall below the value determined by the setting of the movable contact of the potentiometer 59, a voltage would appear on the grid of the amplifier and after amplification would appear on the grid 71 of the thyratron. However, it will be noted that this voltage would be approximately 180° out of phase with the plate voltage of tube 68 so that conduction would not take place.

The electronic circuits are shown by way of example only and it is obvious that various other circuit arrangements may be utilized with the pressure sensing unit and bridge circuit disclosed.

By eliminating mechanical connections to the pressure sensitive diaphragm and making the operation of the switch depend instead on an electrical potential sensitivity of the switch remains fairly constant over a wide range of operating conditions. In addition the degree of fineness of adjustment possible is greater with the potentiometer than with a mechanical arrangement and adjustments may be made from a position remote from the location of the switch itself. The switch will operate efficiently at very low pressures with good stability and sensitivity, for example, the device was successfully used to operate an air mileage pump to maintain pressure equal to that of an external source at pressures ranging from 0.00009 pound per square inch to 0.24 pound per square inch.

Several important features of the pressure sensing unit will become apparent in the following description of the mechanical details thereof shown in Figures 2 and 3.

The pressure sensing unit comprises a relatively flat cylindrical metal housing composed of two parts 10 and 11 fastened together by screws 37 threaded into the portion 11 of the housing. The assembled housing includes a thin cylindrical chamber 14 within which lie the capacitor elements of the bridge circuit. The diaphragm 17 which constitutes the common element of the two capacitors is provided near its outer edge with an annular reinforcing ring 33 which is clamped between the two sections of the housing and is insulated therefrom by annular insulating gaskets 34 and 35 on either side of the reinforcing ring. Sleeves 36 of insulating material are provided around each screw 37 to insulate the ring 33 from said screws and from the housing. Flat metallic disks 12 and 15 attached to the housing by circumferentially spaced screws 29 and 30 respectively form the other conductor for each of the bridge circuit capacitors. Deflection of the diaphragm is limited by the disks 12 and 15 so that distortion of the diaphragm under extreme conditions of pressure unbalance is prevented. To prevent shorting of the capacitor under such conditions, an insulating coating 13 and 16 is applied to each disk on its face nearest the diaphragm. Each of the disks 12 and 15 is backed by spacers 25 and 26 and insulating washers 27 and 28, respectively placed around each of the screws 29 and 30. Each of the screws 29 and 30 is insulated from the housing where it passes therethrough by bushings 23 and 24 respectively and is provided with a retaining nut and washer 31, 32. External electrical connection to the disks 12 and 15 is made through connector lugs 81 and 82 and one of the screws 29 and 30. A central bore 20 in part 10 and a similar bore 21 in part 11 can be provided with a fitting to carry the pressures $P_1$ and $P_2$ respectively into the chamber containing the diaphragm.

Part 11 of the housing is provided with a bore 39 through which passes a pin 38 electrically connected to the diaphragm 17. The pin passes through the gasket 35 and is pressed into the reinforcing ring 33. The free end of the pin projects into a chamber 78 formed in a block 40 fixed to part 11 and is connected by means of an insulated wire 80 to connector pin 43 of a coaxial cable connector 42. The element 41 is an insulator disk in the cable connector.

The housing is grounded to the common electrical ground for the bridge circuit and electronic circuit and effectively shields the capacitors from electrical fields outside the housing. All lines of force between the disks 12 and 15 and the diaphragm must pass through the fluid in the system, there being no complete path of solid dielectric for lines of force passing between said disks and diaphragm. This enhances the sensitivity and stability characteristics of the switch when air is the fluid since it has more stable dielectric characteristics than practicable known solids.

Obviously many modifications and variations of the present invention are possible in the light of the above teachings. It is therefore to be understood that within the scope of the appended claim the invention may be practiced otherwise than as specifically described.

What is claimed is:

In a pressure responsive switch, a pressure sensing unit comprising a relatively flat cylindrical housing formed from two mating separable sections, a thin metallic diaphragm clamped between the two sections of the housing dividing the housing into two chambers, each having a port to admit a gaseous fluid, an annular gasket on each side of the diaphragm to insulate it from the housing, a circular metallic disk in each of said chambers forming with said diaphragm a pair of capacitors, means attaching said disks to the housing and insulating them therefrom, a first source of voltage providing a potential with respect to ground to one of said disks, a second source of voltage providing a potential with respect to ground to the other disk, means insulated from the housing for connecting said sources of voltage to their respective disks and means for adjusting the first and second voltages so that a predetermined pressure differential may exist between the two chambers of the unit; said housing being connected to ground so that no complete path of solid dielectric exists for lines of force from the diaphragm to either of the disks, with the maximum deflection of the diaphragm being limited by contact of the diaphragm with one or the other of said disks.

References Cited in the file of this patent

UNITED STATES PATENTS

| | | |
|---|---|---|
| 2,092,762 | Kroger | Sept. 14, 1937 |
| 2,261,364 | Grove | Nov. 4, 1941 |
| 2,347,590 | Binder | Apr. 25, 1944 |
| 2,384,202 | Smith | Sept. 4, 1945 |
| 2,522,574 | Hagenbuck | Sept. 19, 1950 |
| 2,525,016 | Borell | Oct. 10, 1950 |
| 2,538,881 | Schommer | Jan. 23, 1951 |
| 2,547,780 | Reynst | Apr. 3, 1951 |
| 2,567,253 | Strange | Sept. 11, 1951 |
| 2,577,435 | Siebenthaler | Dec. 4, 1951 |
| 2,696,566 | Lion | Dec. 7, 1954 |

OTHER REFERENCES

Kampinsky: Abstract of application Serial Number 219,100, published March 18, 1952, 656 O. G. 894.